July 7, 1931.  H. J. RIHA  1,813,769
MEAT PACKAGE AND PROCESS OF FORMING SAME
Filed Aug. 11, 1924
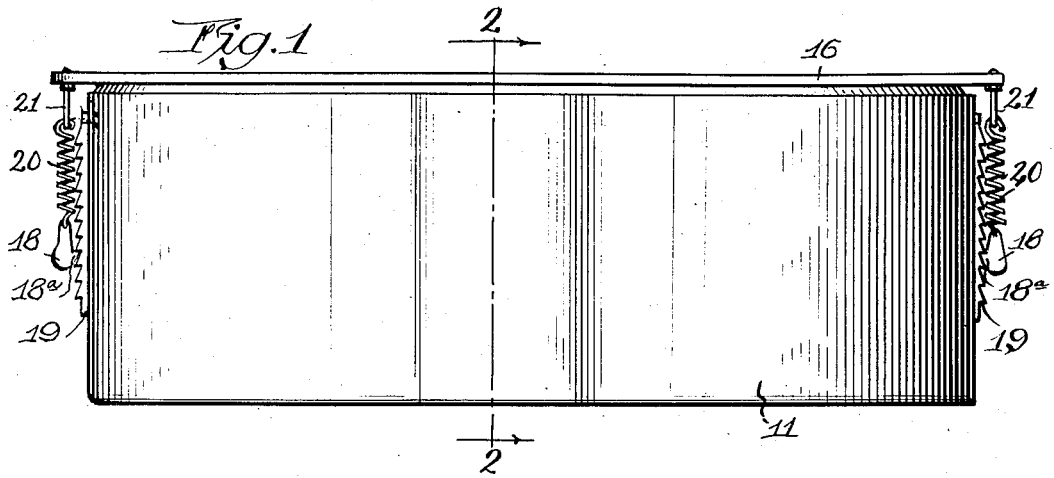
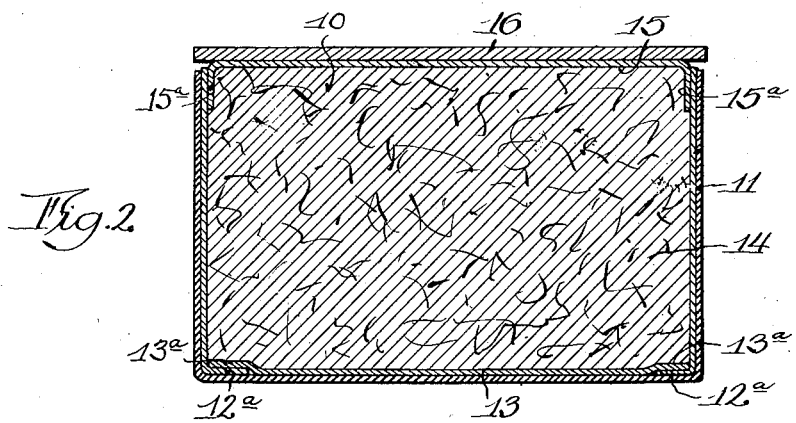
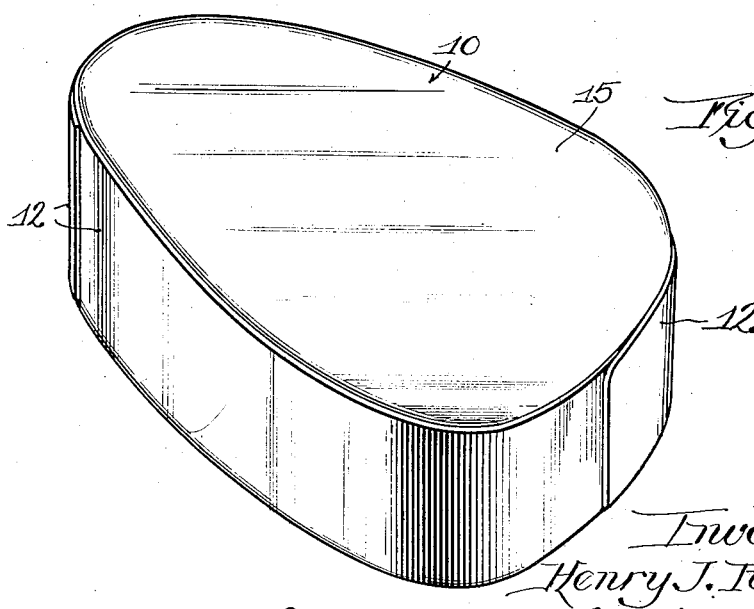
Inventor:
Henry J. Riha,
By Rector, Hibben, Davis & Macauley, Attys.

Patented July 7, 1931

1,813,769

UNITED STATES PATENT OFFICE

HENRY J. RIHA, OF CHICAGO, ILLINOIS, ASSIGNOR TO SWIFT & CO., OF CHICAGO, ILLINOIS, A CORPORATION OF ILLINOIS

MEAT PACKAGE AND PROCESS OF FORMING SAME

Application filed August 11, 1924. Serial No. 731,245.

The invention relates to an improved meat package and the process of forming the same, according to which a quantity of meat may be protected and maintained compactly in a predetermined form or shape by means of an outer covering which adheres to the meat without the use of any auxiliary fastening means. In its preferred form, the invention contemplates the use of a covering of pig-skin which is placed around the meat and which is caused to adhere thereto by the process of cooking. The pig-skin is placed on the meat with the flesh side inward and the cooking of the meat causes the gelatin and other juices of the meat to effect a close union between the meat and the skin while they are contained in a confining casing so that when the package is subsequently released from the container and cooled, the skin still adheres closely to the meat and has sufficient stiffness to maintain the package in a predetermined shape. The invention makes it possible to use small pieces of meat which could not otherwise be usefully employed as a filler for the skin or covering and the subsequent cooking of the mass while it is confined, results in the formation of a compact body in which all of the juices and flavors of the meat are retained and which has the property of retaining its shape indefinitely so that it can be sliced or cut up like an ordinary solid block of meat. Other objects and advantages of the invention will appear more clearly hereinafter.

The nature of the invention will be understood from the following specification taken with the accompanying drawings in which one form of the improved package and one method of carrying out the process are described. In the drawings, Figure 1 shows a side elevation of the container in which the meat package is cooked, a portion of the meat package being shown between the vessel and its cover; Fig. 2 shows a cross-sectional view taken on the line 2—2 of Fig. 1, and Fig. 3 shows a perspective view of a ham-like meat package formed by means of the present invention.

Although various forms of meat packages may be made up by the process of the present invention, there is illustrated in the drawings the method of forming a meat package which resembles in horizontal cross-section a ham. In making up this meat package 10, the container 11 in which the meat is to be cooked is provided with a lining of pig-skin before the meat is placed in the container. This pig-skin lining comprises one or more strips 12 of pig-skin which form the side walls of the package and which are placed within the container with their lower edges 12$^a$ extending horizontally along the bottom of the container, after which the lower wall 13 of pig-skin is placed in position on the bottom of the container with the lateral edges 13$^a$ thereof overlapping the edges 12$^a$ of the strip or strips which form the side wall of the package and the side wall of the lining. Having placed the lining in position with the meat side of the undried pig-skin directed inwardly, the container is filled with meat 14 which may be a solid block of meat cut to the desired shape or a plurality of smaller pieces of meat which are tightly packed in the container so as to form in effect a compact unitary block of meat. The outer surface of the meat body should preferably be formed by comparatively lean meat. The meat is then covered by a layer of pig-skin 15 with the meat or fat side thereof directed downwardly and the lateral edges 15$^a$ of this covering layer are tucked in within the upper edges of the side wall 12. This operation may be effected by pressing the meat inwardly adjacent the top edges of the side wall 12 to permit the lateral edges 15$^a$ of the top layer to be inserted, after which the meat is spread outwardly and pressed downwardly so that the top layer occupies a horizontal position by placing thereon the cover 16 of the container and forcing it downwardly. The cover 16 is resiliently connected to the container 11 by suitable means such, for example, as lugs 18 having teeth 18ᵃ engaging rack bars 19 attached to the ends of the container 11, the lugs 18 being connected to coil springs 20 which are attached to attaching members 21 secured to the ends of the cover. The springs 20 operate to maintain a continuous pressure on the upper surface of the meat so that it is spread outwardly within the container 11 and maintained in compact form during the process of cooking.

Having packed the meat within the container and within the surrounding lining, formed preferably of pig-skin, in the manner above described, the container with its contents is placed in an oven or the like to cook and during the process of cooking, the expansion which may take place is permitted by the spring 20 which allow the cover 16 to move upwardly. As the cooking process goes on, the juices of the meat are confined by the pig-skin lining of the container so that the flavor of the resulting product is greatly improved as compared with ordinary processes of cooking and at the same time the gelatin and the like which is contained in the pig-skin lining and in the meat operates to effect a thorough union between the lining and the meat, this union becoming effective and permanent when the package is subsequently cooled after the cooking process has been completed. When the meat package has been sufficiently cooled within the container, it is removed therefrom, and it is then found that the pig-skin covering adheres firmly to the meat and has sufficient stiffness to maintain it in the desired shape which is determined by the form of the container in which it is cooked.

By means of this invention various forms of meat packages may be made up to suit any desired purpose. The packages may be made to resemble a ham, as shown in the drawings, or they may be made rectangular in cross-section so that they are suitable for slicing to form sandwiches, and any form of package may be made up from a plurality of small pieces of meat which in the resulting package give the same effect as would be given by one solid piece of meat. The covering may be formed of relatively small pieces of pig-skin or the like which could not otherwise be usefully employed, so that the provision of the covering does not materially increase the cost of the package. The pig-skin, that is, the pig hide from which the hair has been removed, should preferably be undried, as indicated above, so that the flesh side thereof which is directed inwardly will adhere more readily to the contained meat after the process of cooking.

Although one form of package and one method of forming it have been shown and described by way of illustrating the invention, it will be understood that the package and the process may be formed in various ways and by various methods without departing from the scope of the appended claims.

I claim:

1. The process of forming a meat package which consists in lining a container of the desired contour with strips of pig-skin overlapping each other and having the fat side thereof directed inwardly, the overlapping portions of said pigskin being parallel to the surface of the body of meat located inwardly therefrom and having their edges spaced apart, placing within said lining a body of meat closely filling the same, placing a cover of pig-skin over said meat body with the fat side thereof directed toward said meat body, applying pressure to said cover, cooking said meat body while confined in said covering of pig-skin under pressure, and subsequently cooling said meat body while it is so confined.

2. A meat package comprising a body of meat and an outer stiffening cover formed of a plurality of overlapping pieces of hide adhering to said body of meat and to each other due to cementing action due to cooking but being otherwise un-united, the overlapping portions of said pieces of hide being parallel to the surface of the body of meat located inwardly therefrom with the edges of said portions spaced apart.

3. The process of forming a meat package which consists in forming from a plurality of overlapping pieces of raw pig skin an outer containing wall of predetermined shape having angularly disposed adjacent wall sections, said pieces of skin having their fleshy sides directed inwardly, filling said containing wall with a composite body of meat formed of a plurality of pieces of meat, and then cooking the package so formed with said containing wall restrained against expansion by confining means.

4. The process of forming a meat package which consists in forming from a plurality of overlapping pieces of raw pig skin an outer containing wall of predetermined shape having angularly disposed adjacent wall sections, said pieces of skin having their fleshy sides directed inwardly, filling said containing wall with a composite body of meat formed of a plurality of pieces of meat, then cooking the package so formed with said containing wall restrained against expansion by confining means, and subsequently cooling said meat body and its containing wall while it is still restrained against expansion by said confining means.

5. The process of forming a meat package which consists in arranging a plurality of pieces of raw pigskin to form an enclosure for a body of meat with the edge portions of adjacent pieces of pigskin overlapping each other in planes parallel to each other and parallel to the surface of the body of meat located immediately inward therefrom, and then cooking said body of meat and said pieces of pigskin under pressure to cause said pieces of pigskin to adhere to each other and to the body of meat entirely by cementing action due to cooking.

HENRY J. RIHA.